(12) United States Patent     (10) Patent No.:   US 12,596,437 B2

McRae        (45) Date of Patent:     Apr. 7, 2026

(54) MONITORING SYSTEM AND METHOD HAVING GESTURE DETECTION

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 881 days.

(21) Appl. No.: 17/825,207

(22) Filed: May 26, 2022

(65) Prior Publication Data

US 2022/0382383 A1     Dec. 1, 2022

Related U.S. Application Data

(60) Provisional application No. 63/194,013, filed on May 27, 2021.

(51) Int. Cl.
| | |
|---|---|
| *G06F 3/01* | (2006.01) |
| *G06V 40/16* | (2022.01) |
| *G06V 40/20* | (2022.01) |
| *H04L 12/28* | (2006.01) |

(52) U.S. Cl.
CPC ............ *G06F 3/017* (2013.01); *G06V 40/172* (2022.01); *G06V 40/28* (2022.01); *H04L 12/282* (2013.01)

(58) Field of Classification Search
CPC ...... G06F 3/017; G06V 40/172; G06V 40/28; H04L 12/282
See application file for complete search history.

(56) References Cited

U.S. PATENT DOCUMENTS

| | | | | |
|---|---|---|---|---|
| 9,465,982 | B2 * | 10/2016 | Karakotsios | ............ G06F 21/32 |
| 11,561,519 | B2 * | 1/2023 | Gordon | .............. H04L 12/2803 |
| 2013/0159939 | A1 * | 6/2013 | Krishnamurthi | ...... G06F 3/0304 |
| | | | | 715/863 |
| 2014/0009378 | A1 | 1/2014 | Chew | |
| 2015/0097685 | A1 * | 4/2015 | Sloo | ........................ G08B 21/14 |
| | | | | 340/632 |

(Continued)

FOREIGN PATENT DOCUMENTS

| | | | | | |
|---|---|---|---|---|---|
| CN | 109886070 | A | * | 6/2019 | |
| CN | 109542233 | B | * | 4/2020 | .............. G06F 3/011 |
| WO | 2018039083 | | | 3/2018 | |

*Primary Examiner* — Pinalben Patel

(74) *Attorney, Agent, or Firm* — Boyle Fredrickson, S.C.

(57) ABSTRACT

A method of and system are disclosed for detecting various gestures by an imaging device and executing a task assigned to these gestures. For instance, the task could include a number of smart home functions, as well as various text and other communication transmissions. The imaging device, which can be a digital camera, is wirelessly communicable with one or more base stations and/or access points over a wireless local area network. The imaging device transmits images and/or videos, which can be reviewed by a computer vision program ("CV"). CV can identify potential gestures in the images and/or videos and compare any such images and/or videos to a database of known gestures. When a gesture is detected, a corresponding task, such as a smart home action, may be executed. Additionally, CV may use facial recognition to first identify an individual, and then execute a task specific to the identified individual based on a detected gesture.

15 Claims, 10 Drawing Sheets

(56)          References Cited

U.S. PATENT DOCUMENTS

| | | | | |
|---|---|---|---|---|
| 2015/0248235 | A1 | 9/2015 | Offenberg et al. | |
| 2016/0042228 | A1* | 2/2016 | Opalka ..................... | G06F 3/01 |
| | | | | 382/103 |
| 2017/0192513 | A1* | 7/2017 | Karmon ................. | G06V 40/28 |
| 2018/0343139 | A1* | 11/2018 | Saxena .............. | G05B 19/0426 |
| 2021/0201661 | A1* | 7/2021 | Al Jazaery ............ | G08C 23/00 |

* cited by examiner

MONITORING SYSTEM AND METHOD HAVING GESTURE DETECTION

CROSS-REFERENCE TO A RELATED APPLICATION

This application claims the benefit of provisional patent application U.S. App. No. 63/194,013, filed on May 27, 2021 and entitled "MONITORING SYSTEM AND METHOD HAVING GESTURE DETECTION", the entire contents of which are hereby expressly incorporated by reference into the present application.

BACKGROUND OF THE INVENTION

1. Field of the Invention

The present invention relates to a system and method of communicating using an imaging device. The present invention more particularly relates to a monitoring system that includes an imaging device and that is configured to decipher various gestures made by a person monitored by the imaging device, as well as corresponding actions based on the detected gestures and motions

2. Discussion of the Related Art

Wi-Fi™ enabled video cameras are in wide use and are often used for monitoring and security purposes. Content captured by wireless enabled cameras can be communicated over the Internet. The content can be viewed in substantially real time and/or recorded for later viewing.

Some video cameras are Wi-Fi™ enabled and battery powered. An example of such a camera is disclosed in U.S. Pat. No. 9,713,084, assigned to Arlo Technologies, Inc., the content of which is incorporated herein by reference. The wireless camera can be connected to a Wi-Fi™ enabled base station (BS) or an access point (AP).

In addition to simply transmitting or recording images, video, and sound, such cameras can detect more specific visual identifiers. For instance, cameras, and/or their associated monitoring systems incorporating them, have become equipped with computer vision (CV) software with facial recognition software permitting the identification of an individual based on specific characteristics of the individual's facial features. CV also can be used to identify other objects such as vehicles, packages, etc.

While previous cameras and/or associated monitoring systems are configured to identify specific objects such as specific individuals, vehicles, and animals; further improvements and functionality is desired. For instance, a need exists for a motoring system that is capable of detecting a variety of gestures and/or movements. A further need exists to assign specific actions to be taken in response to the detection of identified gestures and/or movements.

SUMMARY OF THE INVENTION

In one aspect, a method is disclosed of using a monitoring system to detect specific human gestures and to automatically react to such detection in a pre-specified manner. The gesture may be a single configuration of a hand or another portion of the person's body, a series of such configurations or orientations occurring in a sequence, such is the case with sign language, or a recognizable motion, such as a hand wave. The method includes capturing media through a monitoring device and, using a controller, identifying a gesture using kinematics or other positional inference analysis, or comparing the media to a database of known gestures. Once a recognizable gesture is detected, the monitoring system can automatically react to the gesture in a designated manner, such as by pushing a notification to a user device such as a smart phone or computer and/or by activating a smart home feature such as a smart lock, a smart light, a security system, etc.

In a further aspect, the method can also include identifying a specific person's face and associating that person with the identified gesture. Tasks then can be executed that associate the gesture with a specific individual. For example, a "JOHN IS WAVING" push notification can be sent to a user device such as a smart phone, or lights may be turned on upon the performance of a pre-specified gesture by an authorized individual.

Another aspect of the present invention provides a monitoring system having a wireless network including at least one, and typically several, imaging devices connected to one another, and possibly to an external server, via WI-FI or the like. The system includes a controller including a memory that stores a database of gestures, as well as a gesture module and a trigger module. The gesture module includes instructions that, when executed by the processor, compare a plurality of images captured by the camera to the database of gestures. The trigger module includes instructions to execute a task, such as the transmission of a push notification to a user device or the control of a smart home function.

Similarly, the controller may also store a database of facial characteristics, as well as a facial detecting module that compares a plurality of facial characteristics collected by the image capture element to the database of facial characteristics.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
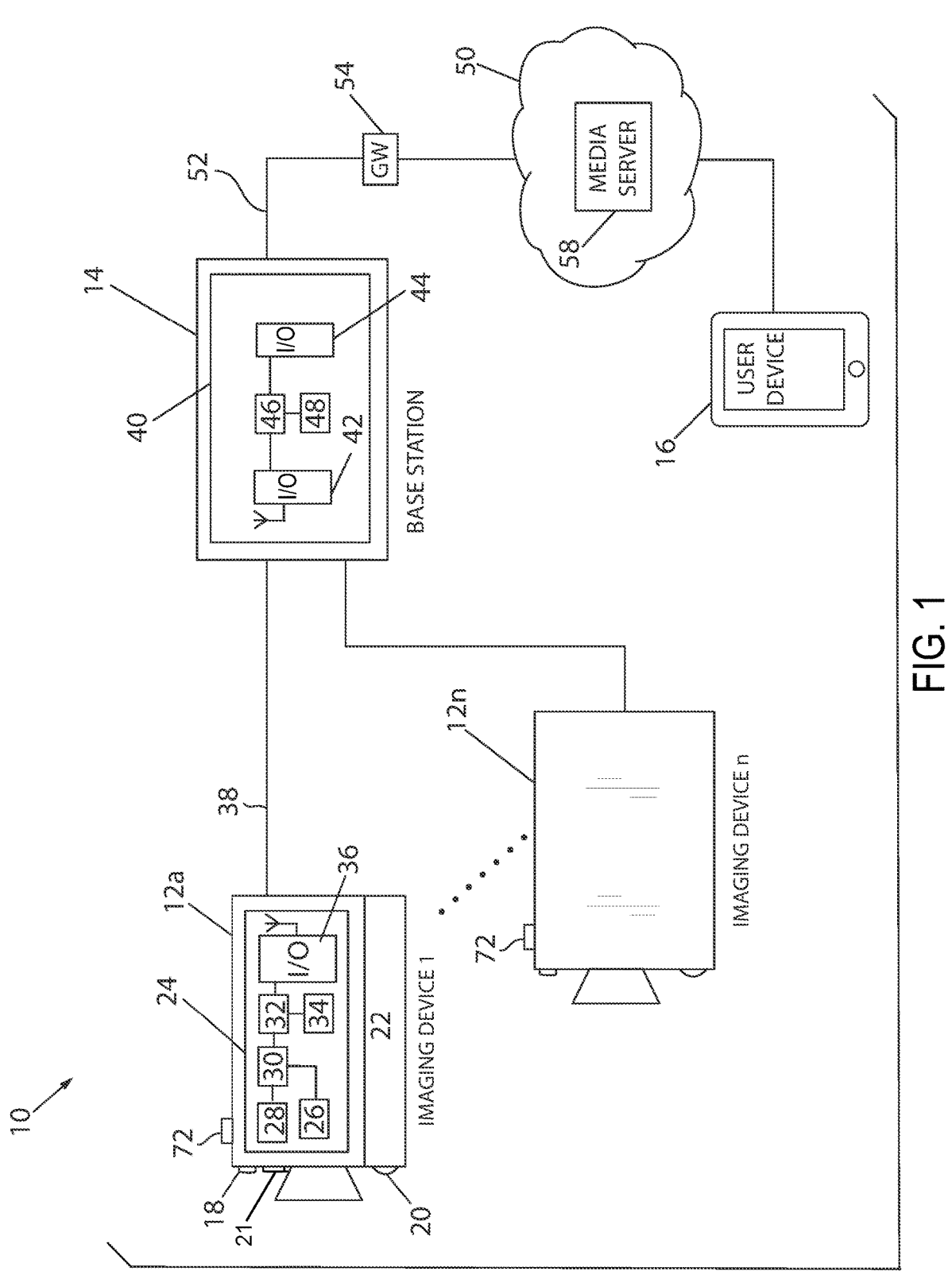
FIG. 1 is a schematic representation of a monitoring system according to aspects of the invention.

Referring now to FIG. 1, in accordance with an aspect of the invention, an electronic system 10 for real-time monitoring can include one or more imaging devices 12 and a hub or base station 14. A number "n" 12a-12n of imaging devices are schematically illustrated in FIG. 1. Unless otherwise noted, references to the numeral "12" as used herein should be construed to apply equally to all of the imaging devices 12a-12n. One or more user devices 16, such as a smart phone, tablet, laptop, or PC, communicate with the base station 14. Each user device 16 includes a display that typically includes both an audio display and a video display, internal computing and storage capabilities, and a program or application servicing as a user interface with the remainder of the system 10. In the case of a smart phone, the display typically will include a touch screen and a speaker.

Each imaging device 12 is configured to acquire data and to transmit it to the base station 14 for further processing and/or transmission to a server and/or the user device(s) 16. Each of the imaging devices 12 may be battery powered or wired. The acquired data typically will correspond to a video image, and each imaging device 12 may be or include a camera such as a video camera. Several such imaging devices may be mounted around a building or other structure or area being monitored. For example, in the case of a residential home, imaging devices 12 could be mounted by each entrance and selected windows, and even on a gate or light pole. An imaging device 12 also could be incorporated into or coupled to a doorbell, floodlight, etc. Still referring to FIG. 1, one or more of the imaging devices 12 may also include a microphone 18, visible and/or infrared (IR) lights 20, a power supply 22, and/or imaging device electronic circuitry 24. Circuitry 24 may include an imager 26, an audio circuit 28, a media encoder 30, a processor 32, a non-transient memory storage 34 and/or a wireless I/O communication device 36, among other things. Each imaging device 12 can communicate with the base station 14 through a network such as a private Wireless Local Area Network (WLAN) 38, hosted by the base station 14 operating as an access point. One such network is an IEEE 802.11 network.

Still referring to FIG. 1, The hub or base station 14 can include base station electronic circuitry 40 including a first wireless I/O communication device 42 for communicating with the imaging devices 12 over the WLAN 38, a second wired or wireless I/O communication device 44 for accessing the Wide Area Network (WAN) 50, such as the Internet through a Local Area Network (LAN) 52 connected to a Gateway and/or Router 54, a processor 46 and/or a non-transient memory storage device 48, among other things. The base station 14 also could be combined with a router 54 or another device in a single module, which would still be considered a "base station" within the meaning of the present disclosure. It should be apparent that "circuitry" in this regard can comprise hardware, firmware, software, or any combination thereof. In one aspect, the imaging devices 12 could be Arlo® cameras, and the base station 14 could be an Arlo base station each available on a stand-alone basis or as part of any number of systems available from Arlo Technologies, Inc. of Carlsbad, California. Alternatively, the base station could be a third party router capable of communicating with the imaging devices generally as described herein with respect to the illustrated base station 14.

The base station 14 may also be in communication with a sever 58, which may be a cloud-server accessible via the WAN 50 and the router 54. Alternatively, as discussed above, the applicable base station functionality could be incorporated into the router 54, in which case the router 54 also would serve as the base station. The server 58 can include or be coupled to a microprocessor, a microcontroller, or some other programmable logic element (individually and collectively considered "a controller") configured to execute a program. Alternatively, interconnected aspects of the controller and the programs executed by it could be distributed in various permutations within the imaging device 12, the base station 14, the router 54, the user device 16, and the server 58. This program may be utilized in filtering, processing, categorizing, storing, recalling, and transmitting data received from the imaging device 12 via the base station 14.

This program, while operating at the server level, may be utilized in filtering, processing, categorizing, storing, recalling, and transmitting data received from the imaging device 12 via the base station 14. Server 58 may also be in communication with or include a computer vision program ("CV"), which can apply one or more filters or processes, such as edge detection, facial recognition, motion detection, etc., to one or more detected characteristics of the recording such as, but not limited to, identifying an individual, animal, vehicle, or package present in the recording. The CV and further capabilities will further be described below.

In operation, each imaging device 12 can be configured, though suitable mounting of the imaging device 12 and/or through suitable manipulation of its controls, to monitor an area of interest, such as a part of a building or section of property. An imaging device 12 may capture an image automatically upon detection of a triggering event automatically upon detection of a triggering event by a detector 21. The triggering event may be motion, and the detector 21 may be a motion detector. Instead of or in addition to detecting motion, the detector 21 could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from an imaging device 12 of a triggering event, the system 10 can generate an alert such as a push notification ("PN") and send it to one or more user devices 16 for indicating the triggering event. The imaging device 12 also may capture an image upon receipt of a command from a user device 16.

Whether camera operation is triggered by a command from a user device 16 or by detection of a triggering event, the imaging device 12 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14.

The media stream may then be transmitted via the WAN 50 to a remote data storage device in communication with a media server 58 for data storage and processing. The storage device may be a cloud-based storage device, and the media sever 58 may be a cloud server accessible via a wireless connection. Server 58 may also communicate with or include a computer vision program ("CV"), which can apply one or more filters or processes, such as edge detection, facial recognition, motion detection, etc., to one or more detected characteristics of the recording such as, but not limited to, identifying an individual, animal, vehicle, or package present in the recording. A filtered or otherwise processed image can then be displayed on the user device 16, along with additional visual and/or audio messaging such as a text and/or audio message identifying a generic or particular person or object.

Figure 2:
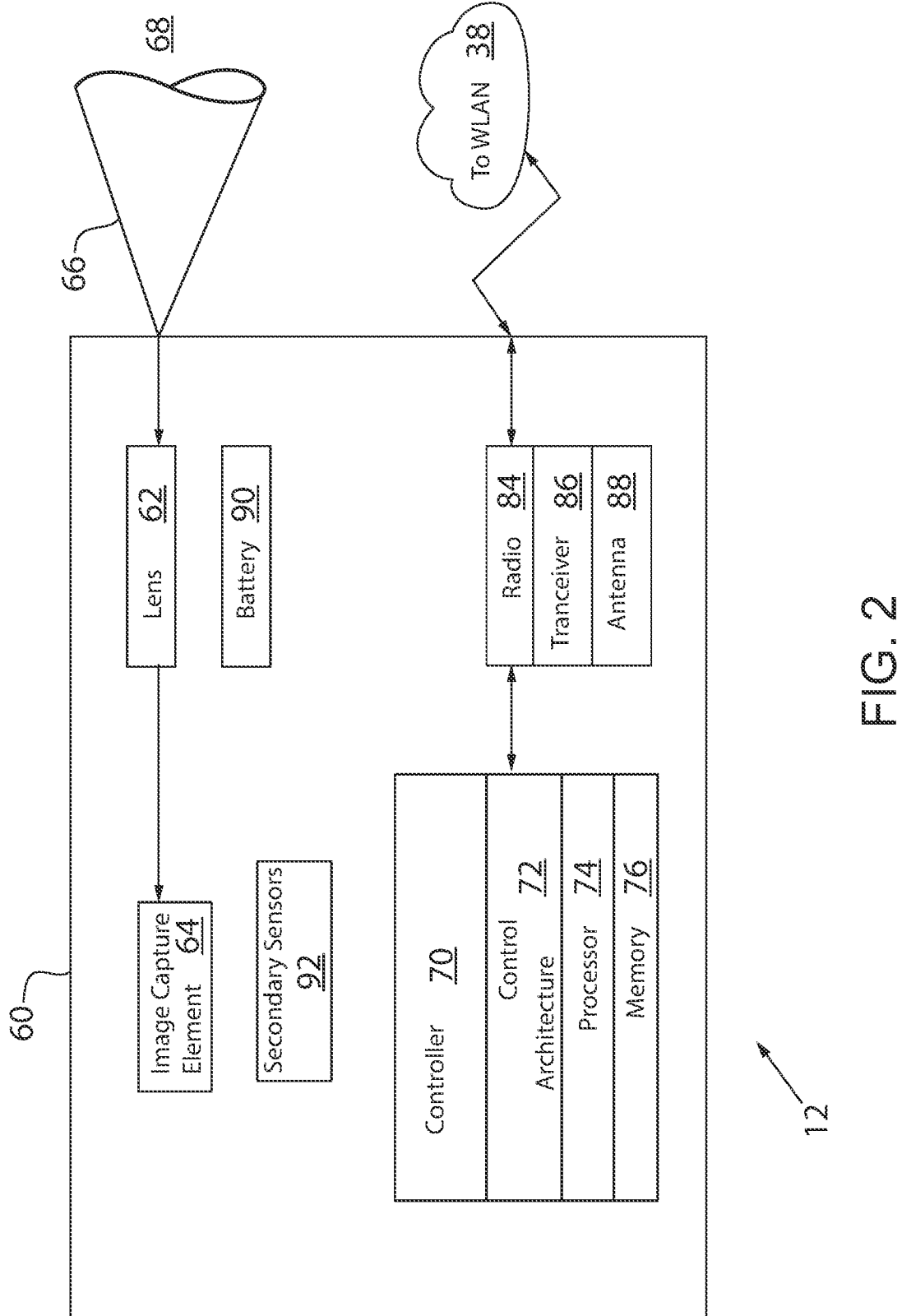
FIG. 2 is a block diagram representing an imaging device of the system shown in FIG. 1.

FIG. 2 represents an example of imaging device 12 shown in FIG. 1. In the illustration, the imaging device 12 has a small and compact housing 60 for enclosing and protecting the various camera components illustrated as blocks in FIG. 2. The imaging device 12 includes a lens 62 and an image capture element (or primary sensor) 64. The image capture element 64 can be any suitable type of image capturing device or sensor; including, for example, an area array sensor, a Charge Coupled Device (CCD) sensor, a Complementary Metal Oxide Semiconductor (CMOS) sensor, or a linear array sensor, just to name a few possibilities. The image capture element 64 may capture images in suitable wavelengths on the electromagnetic spectrum. The image capture element 64 may capture color images and/or grayscale images.

The imaging device 12 has a field of view 66 extending radially from the outwardly facing lens 62. The field of view 66 is a portion of the environment 68 within which the imaging device 12 can detect electromagnetic radiation via the lens 62 and image capture element 64. The imaging device 12 is configured to capture images. An image is a digital representation of a scene for the environment 68 as captured by the imaging device 12. Capturing an image refers to the act of obtaining and recording an image data file or stream of the digital representation. The scene is the portion of the environment 68 observed through the field of view 66. Capturing a plurality of images in a timed sequence can result in a video. Capturing a video refers to the act of obtaining and recording a video data file or stream of the digital representation.

Still referring to FIG. 2, the imaging device 12 has a controller 70 including a control architecture 72 having a processor 74 and a memory 76. Of course, the controller could similarly have multiple processors, such as dual processors and accompanying memory.

The processor 74 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 74 can include a hardware circuit (e.g., an integrated circuit) configured to carry out instructions contained in program code.

The memory 76 stores one or more types of instructions and/or data. The memory 76 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 76 can be a component of a processor, can be operatively connected to a processor for use thereby, or a combination of both. The memory 76 can include various instructions stored thereon. For example, the memory 76 can store one or more modules. Modules can be or include computer-readable instructions that, when executed by a processor, cause a processor to perform the various functions disclosed herein. While functions may be described herein for purposes of brevity, it is noted that the functions are performed by the processor 74 using the instructions stored on or included in the various modules described herein. Some modules may be stored remotely and may be accessible by a processor using, for instance, various communication devices and protocols.

The imaging device 12 communicates wirelessly (e.g., with the base station 14) via a radio 84. An example of a radio includes a wireless local area network (WLAN) radio. With the WLAN radio 84, the imaging device 12 generally communicates over a short-range wireless communication network, such as the WLAN 38. In one implementation, the radio 84 includes a transceiver 86 for transmitting and receiving signals to and from the base station 14, via an antenna 88. The transceiver 86 can be separate to or part of the control architecture 72. The wireless communication can be as prescribed by the IEEE 802.11 standards in accordance with the Wi-Fi™ communication protocol. It is appreciated, however, that the imaging device 12 can be adapted to perform communications in accordance with other known or to be developed communication protocol, or even a proprietary communication protocol developed for a particular application. Also, while only a single transceiver 86 and single antenna 88 is shown, multiple transceivers and multiple antennas can be used to communicate at multiple communication frequency bands. Alternatively, the single transceiver 86 and the single radio 84 can communicate over multiple frequency bands.

The imaging devices 12 may be powered by a battery (or battery pack) 90. The imaging devices 12 can further include secondary sensors 92. For example, the secondary sensors 92 may be a microphone, a motion sensor, a temperature sensor, an image sensor, or a vibration sensor. One or more of these sensors 92 may form the detector 21 of FIG. 1.

An exemplary camera capable of incorporating aspects of the invention is an Arlo Ultra brand camera available from Arlo Technologies in Carlsbad, California, US. Before moving to other components of the system 10, it should be understood by somebody skilled in the art that the imaging device 12 includes many additional conventional components typically found in a wireless camera. Further discussion regarding these components is not provided herein since the components are conventional.

Figure 3:
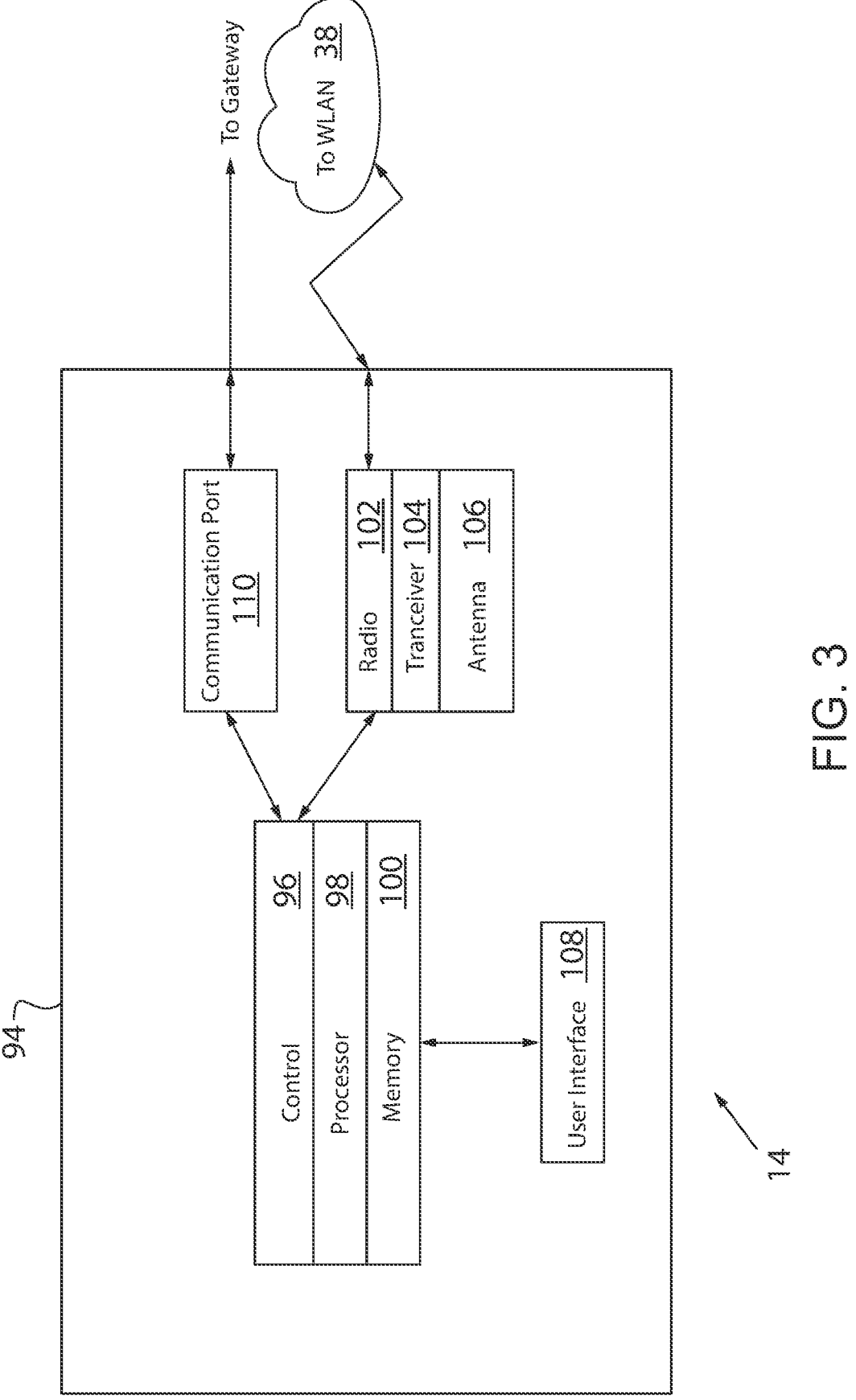
FIG. 3 is a block diagram representing a base station of the system shown in FIG. 1.

Turning now to FIG. 3, the figure represents an example of the base station 14 shown in FIG. 1. In the illustration, the base station 14 is a stand-alone module including a housing 94 for enclosing and protecting the various components illustrated as blocks in FIG. 3. The base station 14 has a controller 96, including a processor 98 and a memory 100. While the arrangement of FIG. 3 shows a single processor 98 and a single memory 100, it is envisioned that many other arrangements are possible. For example, multiple elements of the base station 14 can include a distinct processor and memory.

The processor 98 can include a component or group of components that are configured to execute, implement, and/or perform any of the processes or functions described herein for the base station 14 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 98 can include a hardware circuit (e.g., an integrated circuit) configured to carry out instructions contained in program code. In arrangements in which there are a plurality of processors, such processors can work independently from each other, or one or more processors can work in combination with each other.

The base station 14 includes a memory 100 for storing one or more types of instructions and/or data. The memory 100 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 100 can be a component of the processor 98, can be operatively connected to the processor 98 for use thereby, or can be a combination of both.

In one or more arrangements, the controller can include various instructions stored thereon. For example, the controller can store one or more modules. Modules can be or include computer-readable instructions that, when executed, cause the processor 98 to perform the various functions disclosed for the module. While functions may be described herein for purposes of brevity, it is noted that the functions are performed by the processor 98 or another portion of the controller using the instructions stored on or included in the various modules. Some modules may be stored remotely and accessible by the processor 98 or another portion of the controller using, for instance, various communication devices and protocols.

The base station 14 communicates wirelessly (e.g., with the imaging devices 12) via a radio 102. An example of a radio includes a wireless local area network (WLAN) radio. With the WLAN radio 102, the base station 14 generally communicates over a short-range wireless communication network, such as the WLAN 38. In one implementation, the radio 102 includes a transceiver 104 for transmitting and receiving signals to and from the base station 14, via an antenna 106. The transceiver 104 can be separate to or part of the controller 96. The wireless communication can be as prescribed by the IEEE 802.11 standards in accordance with the Wi-Fi™ communication protocol. It is appreciated, however, that the base station 14 can be adapted to perform communications in accordance with other known or to be developed communication protocol, or even a proprietary communication protocol developed for a particular application. Also, while only a single transceiver 104 and single antenna 106 is shown, multiple transceivers and multiple antennas can be used to communicate at multiple communication frequency bands. Alternatively, the single transceiver 104 and the single radio 102 can communicate over multiple frequency bands.

The base station 14 includes a user interface 108. The user interface 108 can include an input apparatus and an output apparatus. The input apparatus includes a device, component, system, element, arrangement, or groups thereof that enable information/data to be entered into the base station 14 from a user. The output apparatus includes any device, component, arrangement, or groups thereof that enable information/data to be presented to the user. The input apparatus and the output apparatus can be combined as a single apparatus, such as a touch screen commonly used by many electronic devices.

The base station 14 includes a communication port 110, which is configured to provide a communication interface between a larger computer network, such as the Internet, via the gateway.

In one construction, since the base station 14 is powered by an enduring power source (e.g., power outlet), it is not necessary for the base station 14 to be operated in a default sleep mode, although this is not precluded. An exemplary base station capable of incorporating aspects of the invention is an Arlo SmartHub base station available from Arlo Technologies in Carlsbad, California, US. Before moving to the operation of the system 10, it should be well understood by somebody skilled in the art that the base station 14 may include many additional conventional components typically found in a base station or access point. In addition, as discussed above, some or all of the base station components shown in FIG. 3 could be integrated in part or in whole in the router 54 and/or other system component(s). The component(s) would still be a "base station" within the meaning of that term as used herein.

As briefly mentioned above, the computer vision program ("CV") stored in or accessible by the controller may be equipped with additional features to enhance operating capabilities of system 10. For instance, in addition to the edge detection, facial recognition, and motion detection features, CV can be equipped with more sophisticated processes, such as a feature that allows CV to detect and analyze a variety of different gestures of an individual. These gestures may include a single configuration or orientation of a person's hand or other body part, a series of such configurations or orientations, a specific motion, or some combination thereof. Various examples of such gestures are provided below. The system 10 can employ CV to identify a specific gesture and automatically execute a task in response to that identification.

In one possible mode of operation, the system 10 first operates in a person detection mode, in which incoming media is analyzed to determine if a person enters the field of view 66. Once a person is detected, the system uses CV to analyze incoming media. The analysis may be used without reference to a stored database and use kinematics and other positional analysis. Alternatively, or additionally, the controller of system 10 may store or have access to a database of gestures such as different movements or body part configurations or orientations and can compare an incoming image or video to the database to match the incoming image or video to a stored gesture. Additionally, as described above, any images or videos may be saved for future review, and users can further define additional gestures. Potential gestures that can be identified include a user moving his or her arms, hands, fingers, legs, and/or any other body parts in a specific way or into a specific position or orientation. A number of examples will be described below with reference to FIGS. 6-10, where the gesture detected by the imaging device 12 is shown as GD. Additionally, the imaging device 12 may detect the identity of the individual making the gesture using facial recognition technology FR, which is understood by those having ordinary skill in the art.

Figure 7:
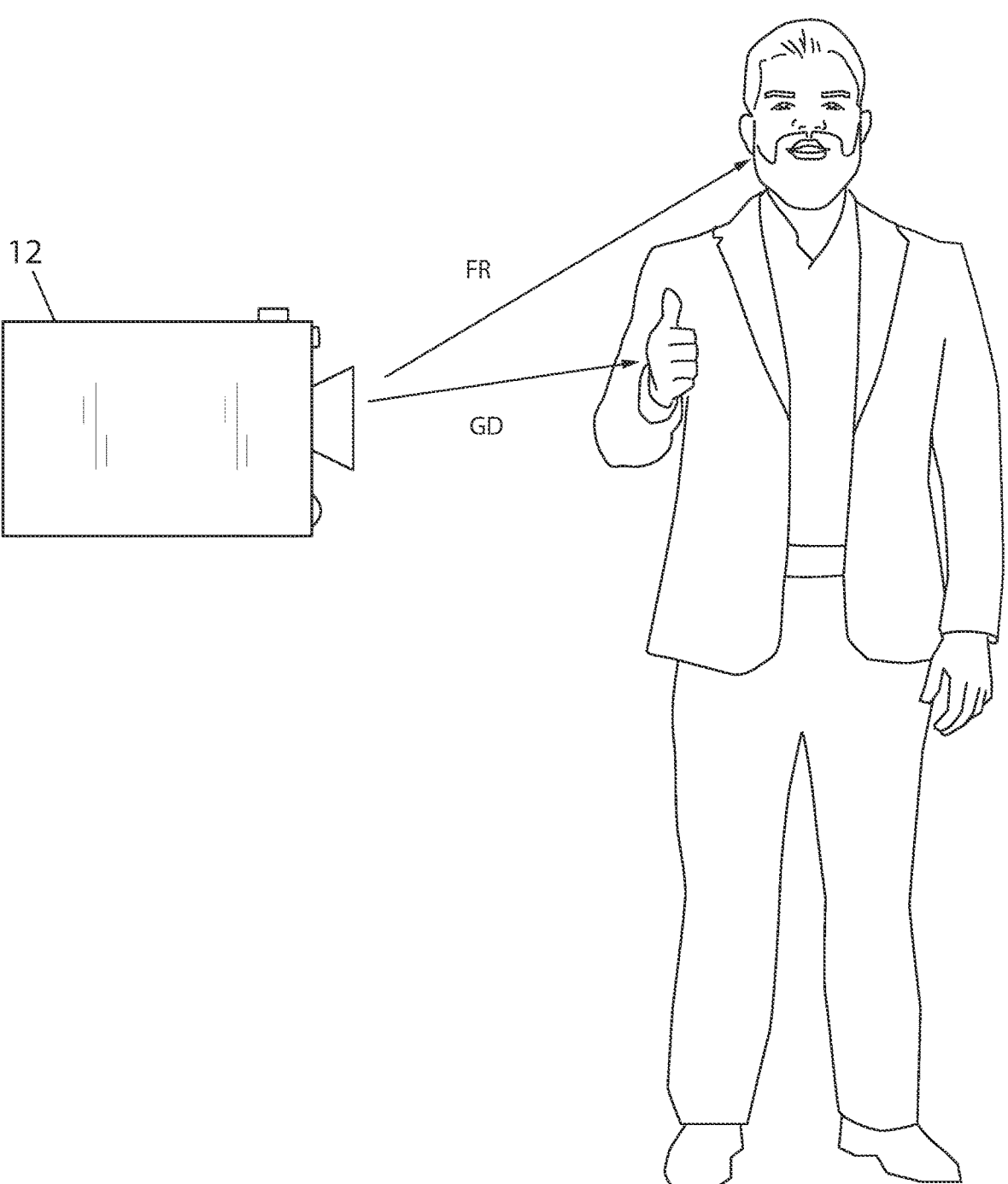
FIG. 7 is a perspective view of the system of FIG. 1, with a second exemplary gesture being detected.
Figure 8:
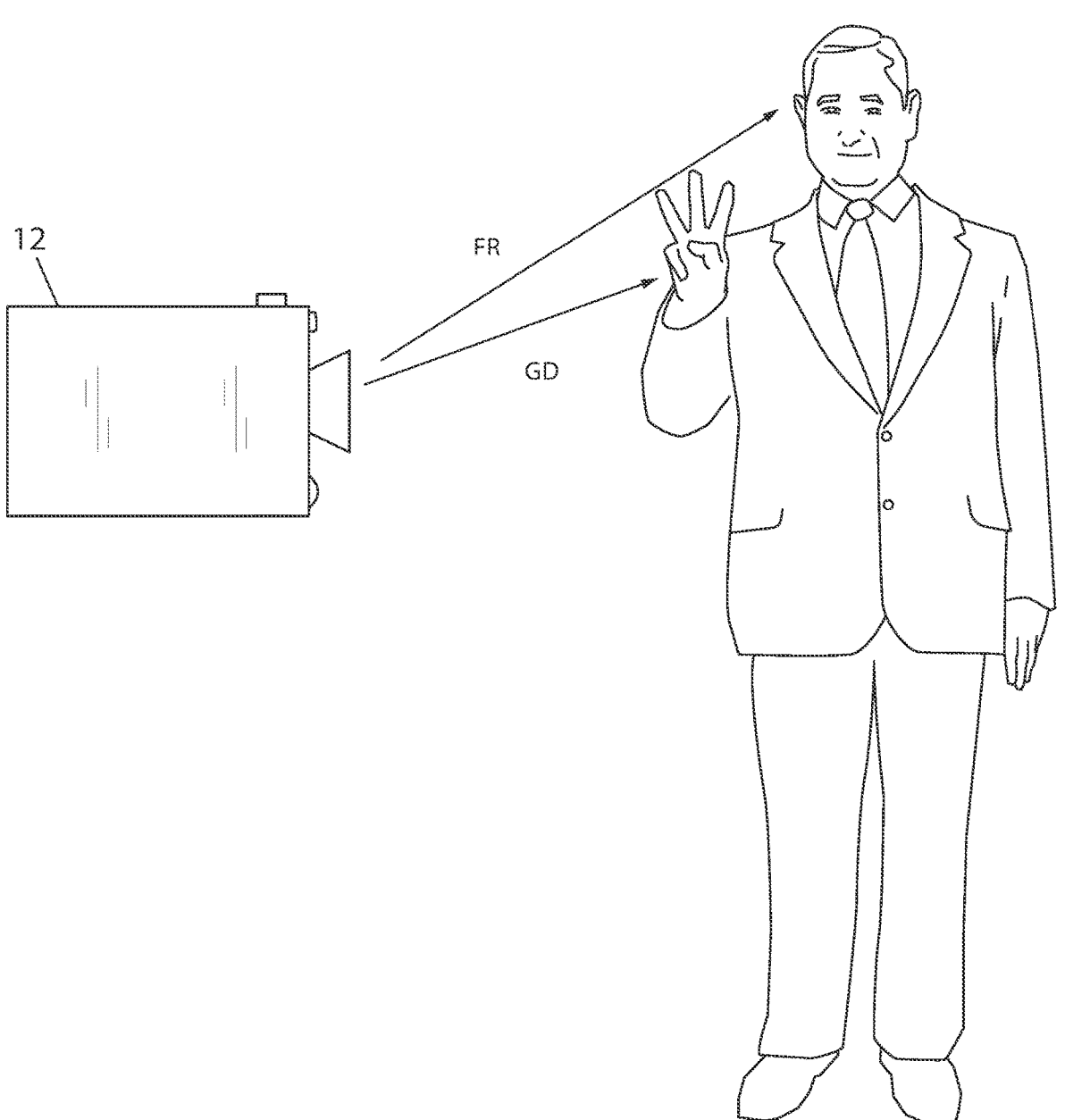
FIG. 8 is a perspective view of the system of FIG. 1, with a third exemplary gesture being detected.
Figure 9:
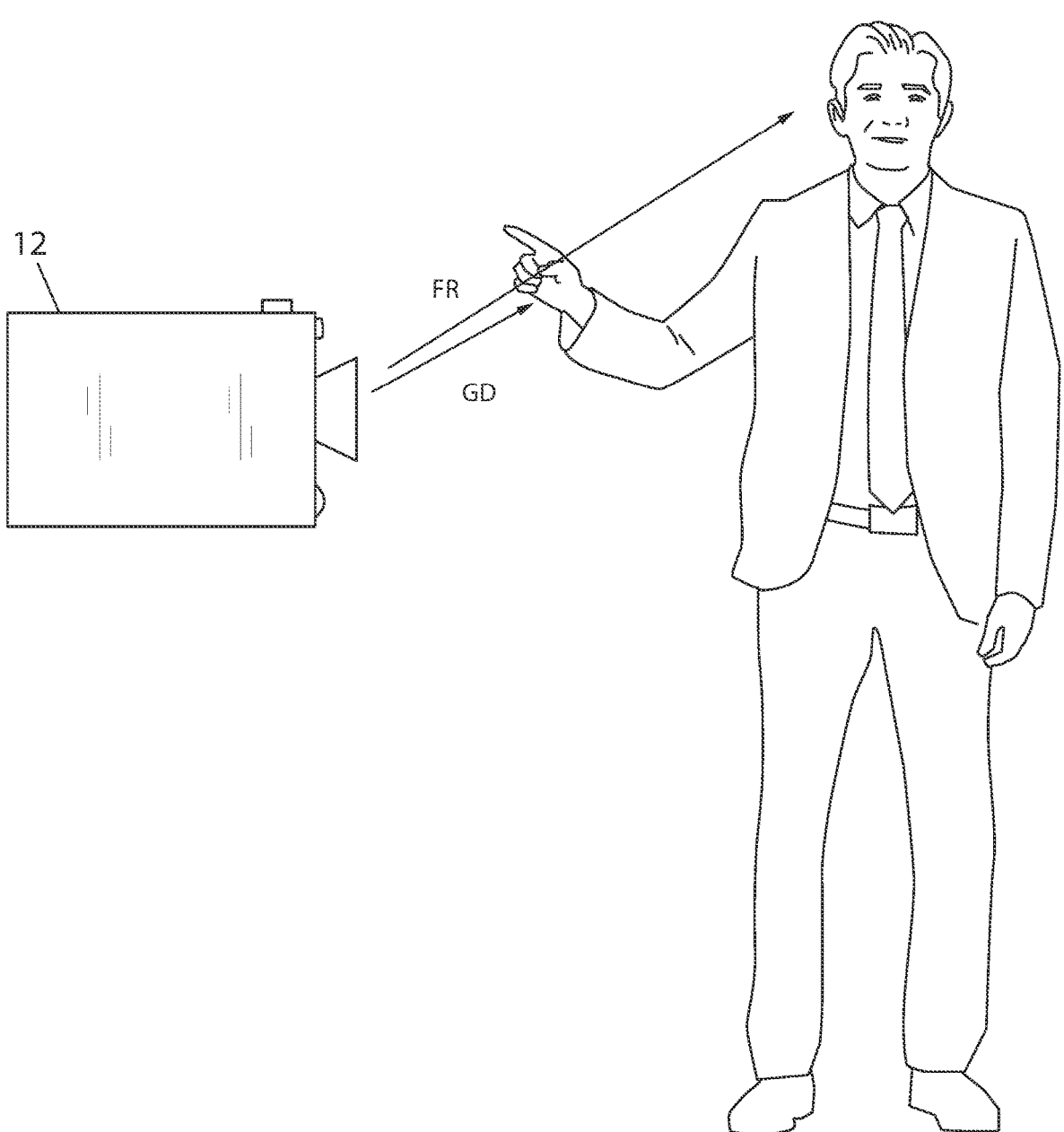
FIG. 9 is a perspective view of the system of FIG. 1, with a fourth exemplary gesture being detected.
Figure 10:
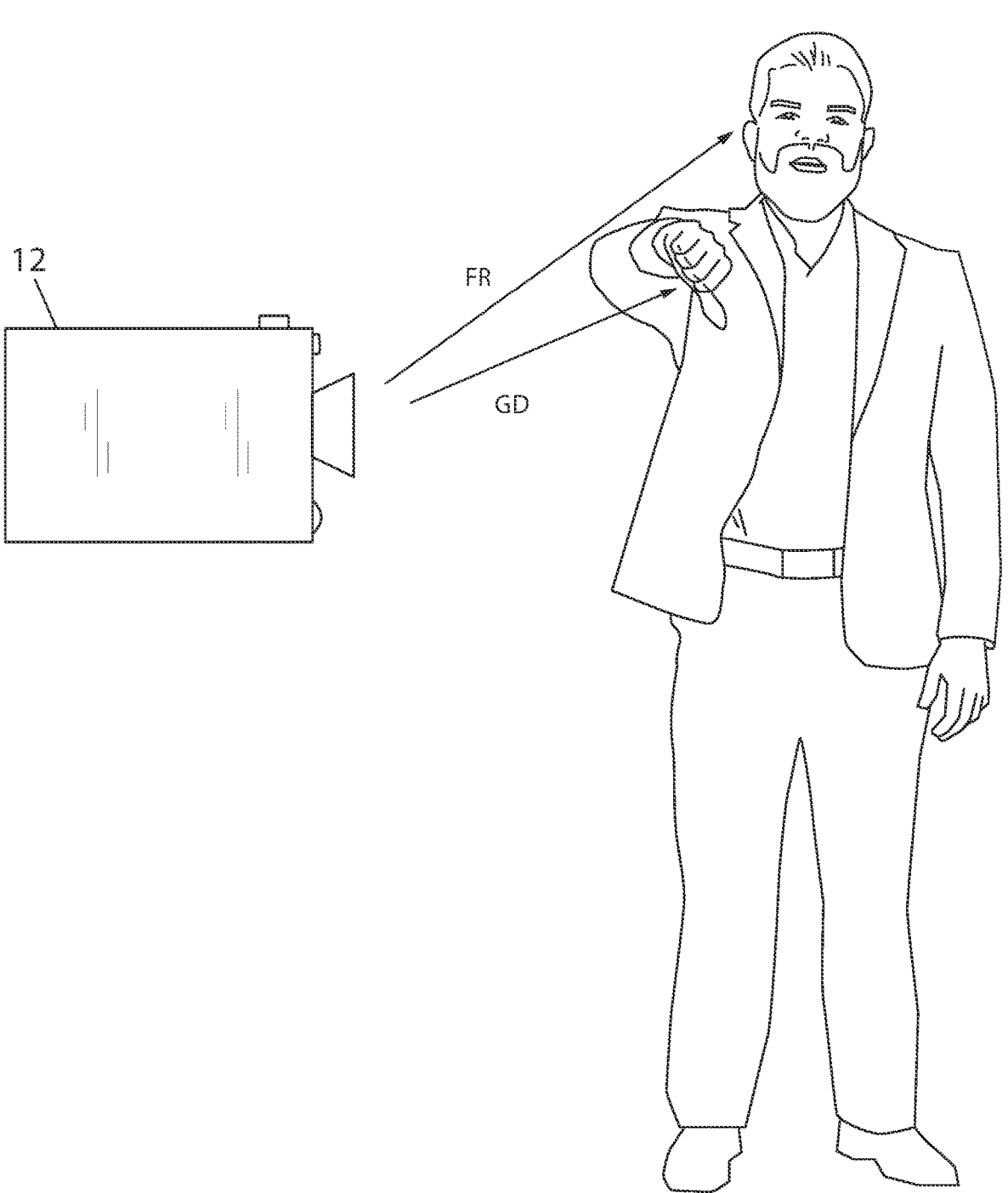
FIG. 10 is a perspective view of the system of FIG. 1, with a fifth exemplary gesture being detected.

As mentioned above, the identified gesture can be a specific hand orientation or configuration. For instance, using the CV, the system 10 can detect when a finger or fingers are pointed in upward or outward directions; such as in a "thumbs up" position as shown in FIG. 7, or the "thumbs down" position as shown in FIG. 10. Similarly, CV can be used to detect a specific number of fingers extending in an upward or outward direction, such as one finger up (FIG. 9), two fingers up, three fingers up (FIG. 8), four fingers up, and all fingers up. Similarly, the system 10 can detect when different combinations of fingers are being raised, for instance, when an index finger and a pinky finger are being raised; when an index finger and a pinky finger are raised and a thumb is stuck outwardly; when an index finger is raised and thumb is stuck outwardly; when an index finger and middle finger are raised and thumb is stuck outwardly; when an index finger, middle finger, and ring finger are raised and thumb is stuck outwardly; when a pinky and ring finger are raised; when a pinky, ring finger, and middle finger are raised; and any other combination of raised and lowered or tucked in fingers occurs.

Furthermore, CV can be equipped to detect common signs made using fingers, including some described above. For instance, CV could detect when an "OK" sign is made by raising the pinky, ring, and middle figures and making an "O" shape between the index finger and the thumb; when a phone sign is made by extending a thumb and a pinky finger and holding the middle three fingers down and then raising the hand to a user's ear; or when a love sign formed by cupping two hands together in the shape of a heart.

Further still, CV may be equipped to detect various sign language gestures. Individual expressions of sign language may be detected, or words, statements, or even sentences could be detected when multiple gestures are sequentially made. Texts, emails, or even audio messages can be generated and displayed from the detected sign language gestures.

Identified gestures also could be specific motions. Such motions may be, for example, the waving of a hand (FIG. 6), clapping, snapping, crossing of the arms, and the like.

Furthermore, CV could detect a specific sequence of gestures. For instance, multiple numbers can be flashed in front of the camera subsequently, which could serve as personal identification number or a security or other number.

As mentioned above, the system 10 can execute a given task in response to a detected action. For instance, once CV identifies a detected gesture, any number of tasks could be executed, including but not limited to, enabling or disabling an alarm or security system; sounding an alarm; contacting emergency service personal or trusted third parties; turning off or on lights; powering or depowering various electronic devices; opening or closing a door; locking or unlocking a door; locking or unlocking a window; opening or closing a window; powering or depowering a smart outlet; and enabling or disabling communication such as over an inter-com, phone, camera, etc.

Additionally or alternatively, the task execution could take the form of sending a notification to one or more user devices which then display a corresponding notification in visual or audio form. The notification could take the form of a push notification, an email, a text, an automated phone call, etc. For instance, brief push messages may be transmitted in the form of a text or push notification based on a specific detected gesture, such as "call me" based on a telephone sign or "I love you" based on a heart sign. Additionally, full messages could be composed using sign language gestures or any other coded gestures. Further, where the system 10 recognizes the user in front of the imaging device 12, it can generate an even more personalized message that indicates who is performing the gesture or other action, for example, "Jeff says call me", or "Amanda says I love you."

The system 10 may be programmed to perform the same action regardless of who is in front of the imaging device 12. Alternatively, as mentioned above, the system 10 can combine the facial recognition capabilities with the gestures to create an even more customized system. For instance, the system 10 can use facial recognition capabilities of CV to confirm the identity of the user who is within the frame of the camera, and then execute a specific task based on the specific gesture that is detected. By way of example, where the imaging device 12 is used at a home residence, the identities of each of the residents of the home and even frequent visitors may be recognized using facial recognition. CV may also be used to identify a class of visitor based, for example, on clothing. For example, a delivery person could be identified as such based on his or her uniform. When a given person is detected, actions can be used to execute tasks associated with that specific person. Each person could use the same gestures to result in execution of the same tasks, or each person could have specific gestures associated with them to execute a given task. For instance, each member of a family may show a different gesture in order to lock or unlock a door. Similarly, certain actions may only be available to certain people. For instance, adults may be the only peoples who are authorized to enable or disable to security system or alarm system by showing a specific gesture. This would help to enhance the security features associated with the system 10. Similarly, the system 10 may rely upon voice recognition to confirm the identity of a detected person.

Figure 4:
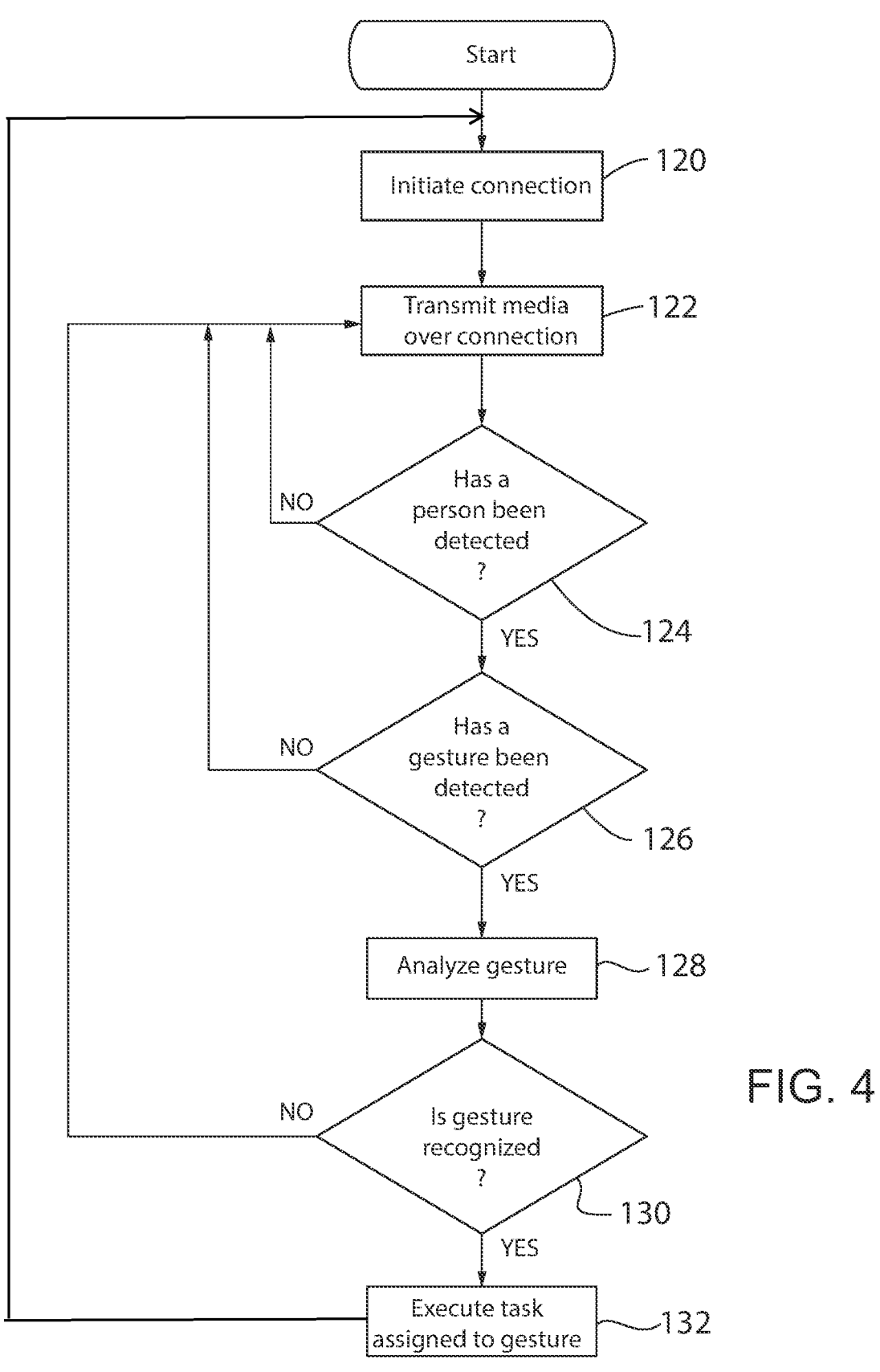
FIG. 4 is flowchart of a method of operating the camera represented in FIG. 2.

One detailed implementation for performing gesture detection and executing a resulting task in the form of providing a notification to a user device is shown in FIG. 4. At block 120, the imaging device 12 establishes a connection with the base station 14, such as by the detection of a triggering event such as a motion sensor being activated or a microphone detecting a sound. Thereafter, media such as videos, images, sounds, and the like are transmitted from the imaging device 12 to the base station 14 and the server 58 as seen at block 122. Then, in block 124, CV is used to determine if a person is detected. If so, the controller will determine whether a person's action (a gesture in this example) is detected (block 126). Otherwise, media will continue to be transferred over the connection without executing a task until a person and a gesture are detected. If a gesture is detected in block 126, the gesture is analyzed (block 128). If the gesture is recognized from the database of stored gestures (block 130) or determined analytically using, for example, kinematics; a task assigned to the gesture is executed (block 132), and the process loops back to the monitoring stage. If not, media will continue to be transmitted until a person and gesture are detected.

Figure 5:
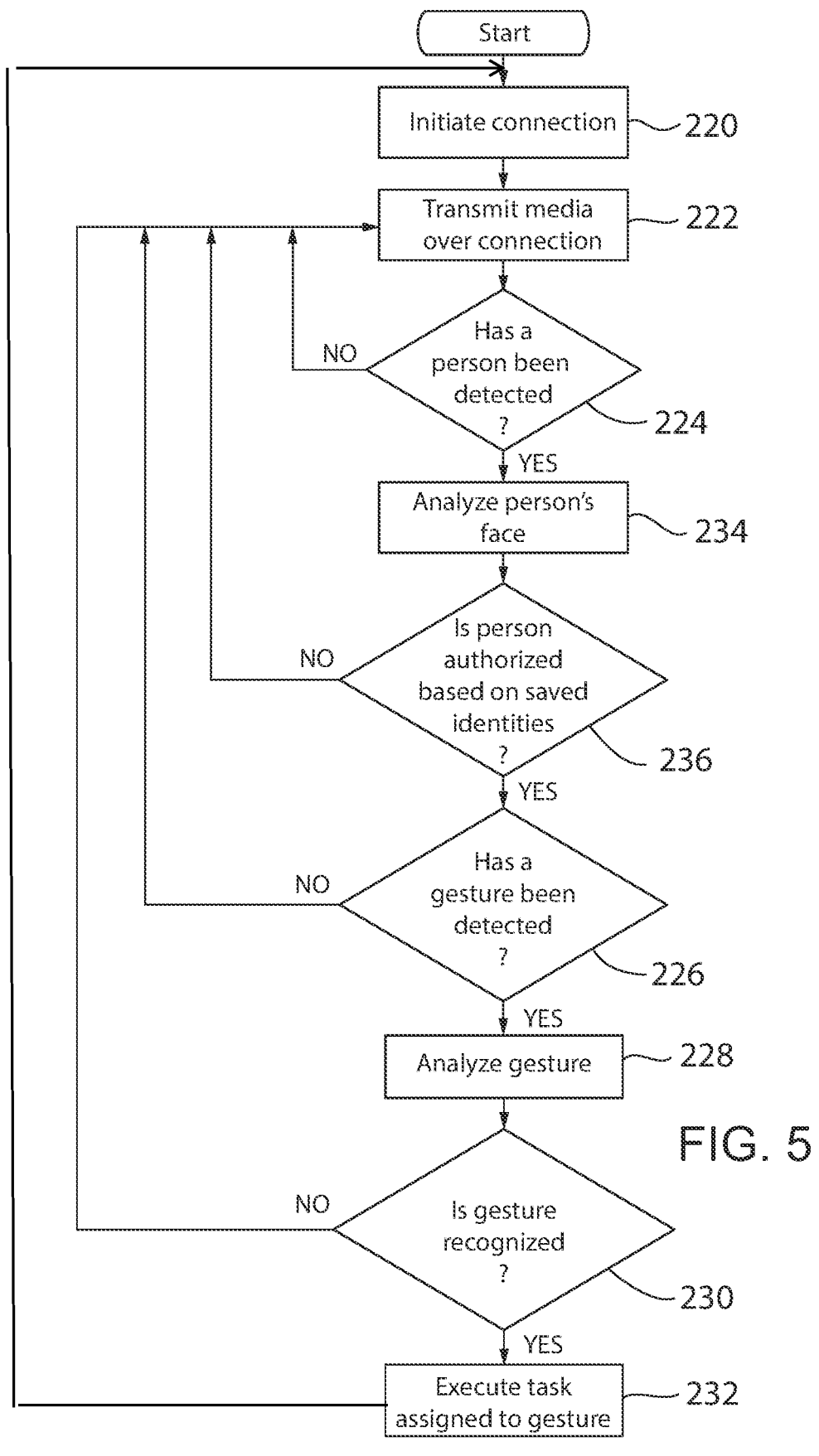
FIG. 5 is another flowchart of a method of operating the imaging device shown in FIG. 2.
Figure 6:
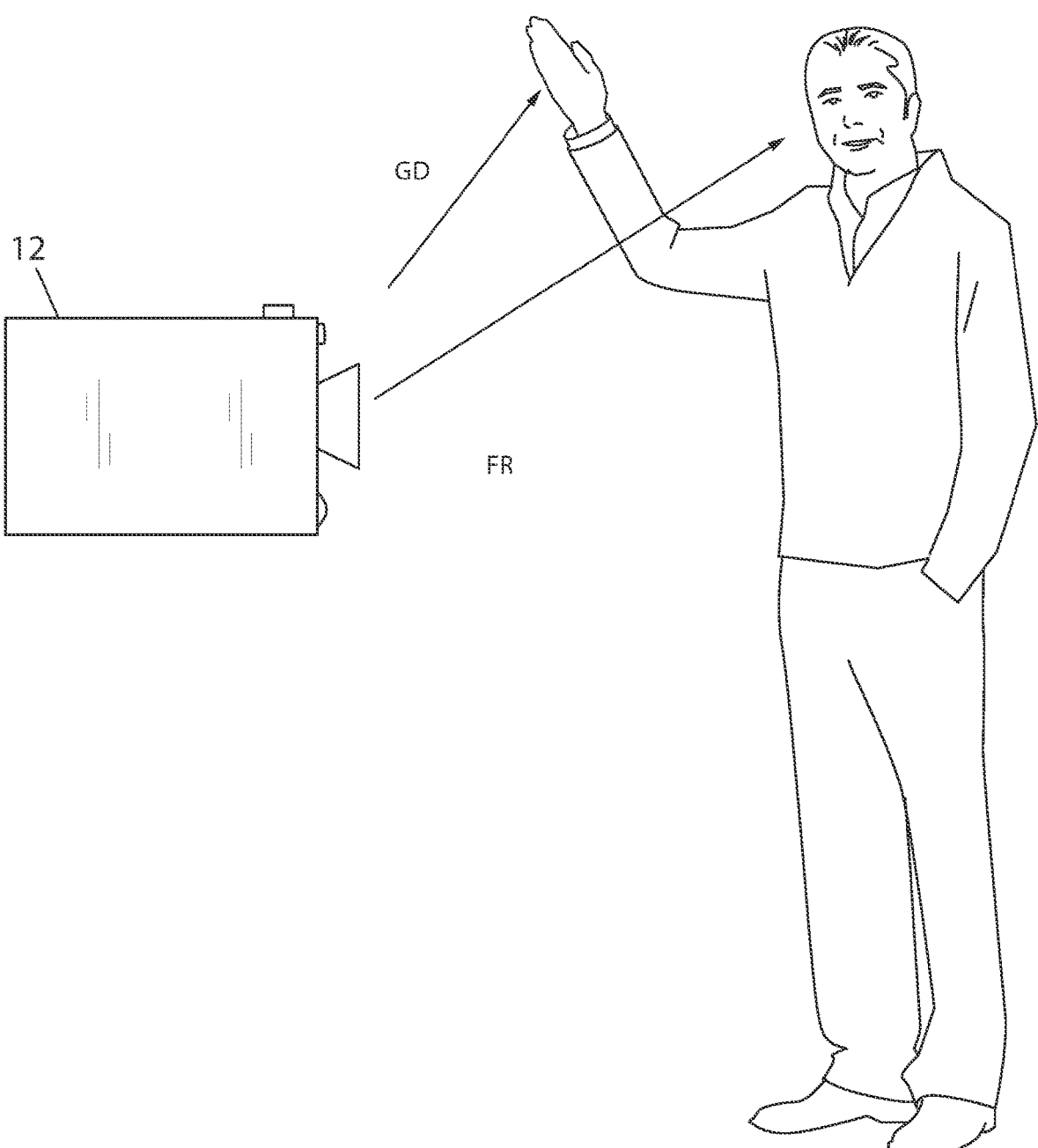
FIG. 6 is a perspective view of the system of FIG. 1, with a first exemplary gesture being detected.

FIG. 5 shows a similar method, where the similar steps from the method of FIG. 4 are indicated using reference numbers increased by 100. The primary difference is that, in addition to the gesture detection described with regard to FIG. 4, the system of FIG. 5 also allows for a specific person's identity to be determined. For instance, after the media is transmitted to the base station as seen in block 222, the controller will determine if a person is detected (block 224). If so, the person's face will be analyzed (block 234). If the person's face is recognized from a comparison of the captured image data to a database of authorized users (block 236), the controller will analyze the gesture (block 228) and determine whether a gesture is detected (block 226). Instead of using facial recognition to identify a specific person, CV could be used to identify a specific class of people, such as a delivery person. If a gesture is detected, the controller will determine whether it is a recognized gesture, either analytically or by comparing image data to a database of stored gestures (block 230). If the gesture is recognized, an assigned task can be executed (block 232). As described above, different tasks may be executed based on a combination of both the person's identity and the gesture performed.

To the extent that it may not be apparent from the forgoing, gestures may be detected and tasks may be executed even if a specific person is not identified in blocks 234 and 236. For example, if an authorized person is recognized as waving at the door in blocks 234 and 236, the system could execute the task of unlocking the door, turning on lights, etc. However, if the person making that same gesture is not identified as being authorized to trigger a specific task, the system may nevertheless execute a different task such as transmitting a push notification to a user device to the effect of: "UNKNOWN PERSON WAVING AT FRONT DOOR." The converse also is true. If a specific person is identified but a gesture is not, a message may be pushed to the user device to the effect of "MARY DETECTED AT FRONT DOOR."

Accordingly, the invention provides a new and useful gesture detection system that automatically executes tasks in response to the detection of specific actions of an individual. Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A method of using a monitoring system comprising:
   capturing media using an imaging device;
   using a controller in communication with the imaging device, detecting and identifying, from the captured media, a first specific gesture by a first person, the first specific gesture being one of a number of pre-defined detectable and identifiable gestures;

associating the first specific gesture with the first specific person;
   using a device in communication with the controller, automatically executing a specific assigned task in response to the identification of the first specific gesture and the first person, the specific assigned task being pre-associated with a determined combination of the first specific gesture and the first specific person,
   detecting and identifying, from the captured media, a second specific gesture by a second person, the second specific gesture being one of the number of pre-defined detectable and identifiable gestures and being different from the first specific gesture;
   associating the second specific gesture with the second specific person; and
   using the device, automatically executing a specific assigned task in response to the identification of the second specific gesture and the second specific person, the specific assigned task being pre-associated with a determined combination of the second specific gesture and the second specific person.

2. The method of claim 1, wherein the task execution comprises transmitting a notification to a user device and displaying an audio and/or visual message on the user device.

3. The method of claim 2, wherein the gesture detection includes detecting a plurality of sign language gestures, and wherein the task execution includes composing a text message or email corresponding to the detected sign language gestures.

4. The method of claim 1, wherein the executing comprises activating a smart home function.

5. The method of claim 4, wherein the smart home function comprises at least one of locking a door, activating an alarm system, activating an audio or video alarm, and changing a light setting.

6. The method of claim 1, wherein the specific gesture is a hand gesture.

7. The method of claim 6, wherein the specific gesture is a series of hand gestures in a specific sequence.

8. The method of claim 1, wherein the specific gesture is a motion or a series of motions.

9. The method of claim 1, wherein the automatically executing comprises activating a first smart home function based on the identification of a first specific gesture by the controller and a second smart home function based on the identification of second specific gesture by the controller.

10. A monitoring system comprising:
   an imaging device configured to capture and transmit images; and
   a controller in communication with the imaging device, the controller including
      a memory communicably coupled to the imaging device and storing a database of specific gestures and a database of facial characteristics of a plurality of specific persons,
      a gesture detecting module including instructions that, when executed, compares an image of a person captured by the imaging device to the database of gestures and identifies a specific gesture,
      a facial detecting module including instructions that, when executed, compares the image captured by the imaging device to the database of facial characteristics and identifies the person in the image captured by the imaging device as a first specific person, and
      an execution module including instructions that, when executed, execute a specific assigned task that is pre-associated with a determined combination of the specific gesture and the first specific person, wherein the specific gesture is a first specific gesture, and the specific person is a first person, and further comprising, using the facial detection module, identifying an image of a second person captured by the imaging device as second specific person, and wherein the execution module is configured to execute a specific task upon identifying a second specific gesture by the second specific person, the second specific gesture being different than the first specific gesture.

11. The monitoring system of claim 10, wherein the execution module is configured to activate a first smart home function based on the identification of a first specific gesture by the gesture detecting module and a second smart home function based on the identification of a second specific gesture by the gesture detecting module.

12. The monitoring system of claim 11, wherein the executed task is a smart home function that moves the locking system between a locked state and an unlocked state.

13. The monitoring system of claim 11, further comprising a security system;
   wherein the executed task is a smart home function that moves the security system between an activated mode and a deactivated mode.

14. The monitoring system of claim 11, wherein the memory further stores a communications module including instructions that when executed, cause a text message to be transmitted to a user device.

15. The monitoring system of claim 14, wherein the memory further stores a sign language module including instructions, that when executed, cause an audio and/or visual message to be transmitted to the user device; and
   wherein the gesture detecting module identifies a plurality of sign language gestures.

* * * * *